United States Patent [19]

Dillon et al.

[11] Patent Number: 4,800,971

[45] Date of Patent: Jan. 31, 1989

[54] SCALE ASSEMBLY

[75] Inventors: Benny N. Dillon; James F. Williams, both of Worthington; Leo J. Niese, Westerville; Amiel R. Helle, Delaware, all of Ohio

[73] Assignee: Masstron Scale, Inc., Columbus, Ohio

[21] Appl. No.: 2,959

[22] Filed: Jan. 13, 1987

[51] Int. Cl.[4] .................... G01G 19/02; G01G 19/04
[52] U.S. Cl. ..................................... 177/134; 177/163
[58] Field of Search .............................. 177/134, 163

[56] References Cited

U.S. PATENT DOCUMENTS

| | | | |
|---|---|---|---|
| 1,222,272 | 4/1917 | Emery | 177/134 X |
| 1,352,441 | 9/1920 | Epright et al. | 177/134 |
| 3,266,585 | 8/1966 | Boadle | 177/134 X |
| 4,392,537 | 7/1983 | Lundborg | 177/134 |
| 4,529,051 | 7/1985 | Stolz et al. | 177/134 |

Primary Examiner—George H. Miller, Jr.
Attorney, Agent, or Firm—Tarolli, Sundheim & Covell

[57] ABSTRACT

A scale assembly has a platform which is connected with load sensing means which provide an output indicative of the magnitude of a load. The platform has an upper portion which includes a body of concrete and a lower portion formed of metal. The upper and lower portions are interconnected to prevent relative movement therebetween upon the application of a load to the platform. The platform is supported at locations spaced longitudinally thereof. The platform has a neutral plane which is disposed in the lower portion of the platform so that the body of concrete is stressed only in compression and the lower portion of the platform is stressed primarily in tension when the platform receives a load to be weighed between the support locations.

19 Claims, 4 Drawing Sheets

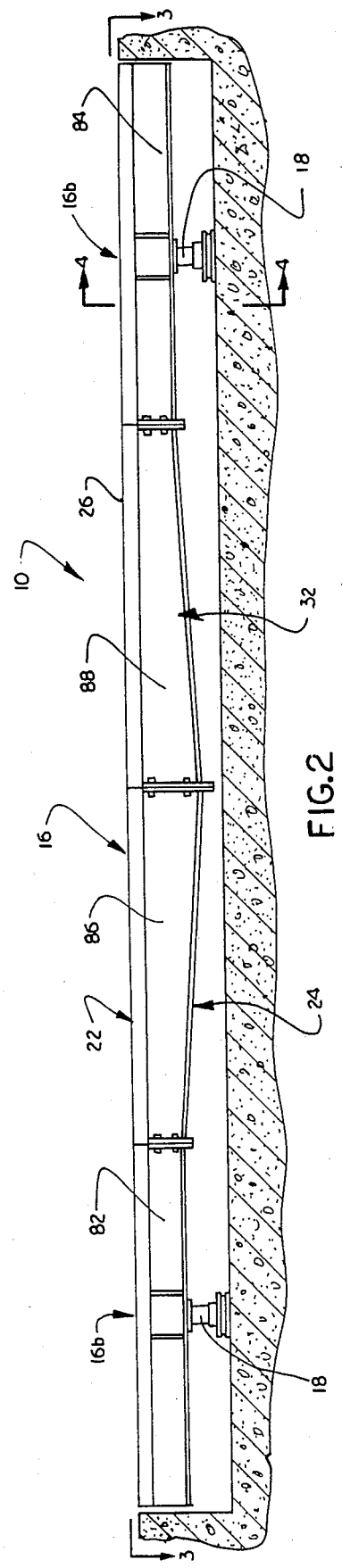
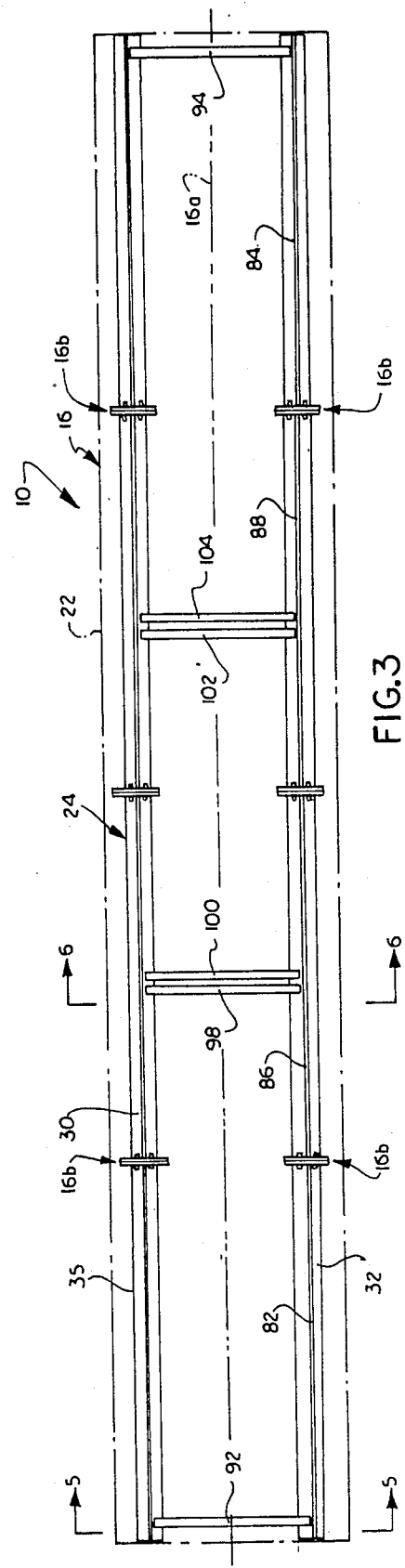
FIG.2
FIG.3

SCALE ASSEMBLY

The present invention relates to a new and improved scale and more particularly to a scale for weighing vehicles such as trucks.

Scales for weighing trucks are well known. Truck scales include a platform or a series of platforms onto which a truck to be weighed is driven. The platform is supported at spaced locations along the length of the platform. Truck scales include load sensing mechanisms which sense the load on the platform. Different load sensing mechanisms are used in truck scales. For example, truck scales may include a number of transducers such as load cells which sense the weight of the load on the platform. Alternatively, truck scales may include a suspension and lever system for sensing the load.

Many truck scale platforms include a body of concrete and a beam structure for supporting the concrete. The beam structure is supported by a foundation. Such truck scales extend for a substantial distance, for example, 60 or 70 feet in length. Thus, truck scales are heavy and costly. It is desirable to minimize the weight and the cost of a truck scale.

BRIEF SUMMARY OF THE PRESENT INVENTION

The present invention relates to a scale assembly and particularly to an improved truck scale. The truck scale of the present invention minimizes the number of load sensing mechanisms which are required and also reduces the weight of the material which is used in the scale. Thus, the overall cost of the scale is minimized.

These advantages are achieved by two features of the present invention. First, the present invention has an improved platform which is a composite structure having a relatively high strength to weight ratio and thus may be of reduced weight. Second, the platform is supported at locations adjacent its ends and includes a beam structure which decreases in height as the beam structure extends from the center of the platform toward the locations at which the platform is supported.

The new and improved platform has an upper portion which includes a body of concrete and a lower portion formed of metal. The platform is supported at spaced locations along the length thereof. The upper and lower portions of the platform are interconnected to prevent relative movement between the body of concrete and the lower portion of the platform upon the application of a load to the platform. The interconnection between the upper and lower portions of the platform causes the platform to function as a composite beam having a neutral plane which is disposed in the lower portion of the platform. This results in the body of concrete being stressed only in compression and the lower portion of the platform stressed primarily in tension when the platform receives a load to be weighed which load is located between the spaced locations where the platform is supported.

The lower portion of the platform comprises a beam structure which includes a pair of beams which extend longitudinally of the scale. The beams are spaced equal distances from the central longitudinal axis of the scale. The beams are associated with the load sensing means and supported adjacent opposite ends of the scale. Between the support locations, the beams are of variable height and thus have a variable rectangular moment of inertia. Specifically, the beams are of greatest height at the middle of the scale and reduce in height as they extend from the middle of the scale toward the opposite locations at which the platform is supported.

The result of the variable height beams and the composite platform structure has enabled a truck scale to be built which has a span between the locations of support of the platform of forty-four (44) feet, a relatively low weight platform structure, and only four (4) locations of support. Thus, the overall cost of the scale is minimized.

Brief Description of the Drawings

The foregoing and other objects and features of the present invention will become more apparent upon a consideration of the following description taken in connection with the accompanying drawings wherein:

FIG. 2 is a side elevational view of the scale assembly of FIG. 1, illustrating the relationship between a load receiving platform and transducers which sense the magnitude of a load;

FIG. 3 is a plan view, taken generally along the line 3—3 of FIG. 2, illustrating the construction of a lower portion of the platform;

DESCRIPTION OF SPECIFIC PREFERRED EMBODIMENTS OF THE INVENTION

General Description

Figure 1:
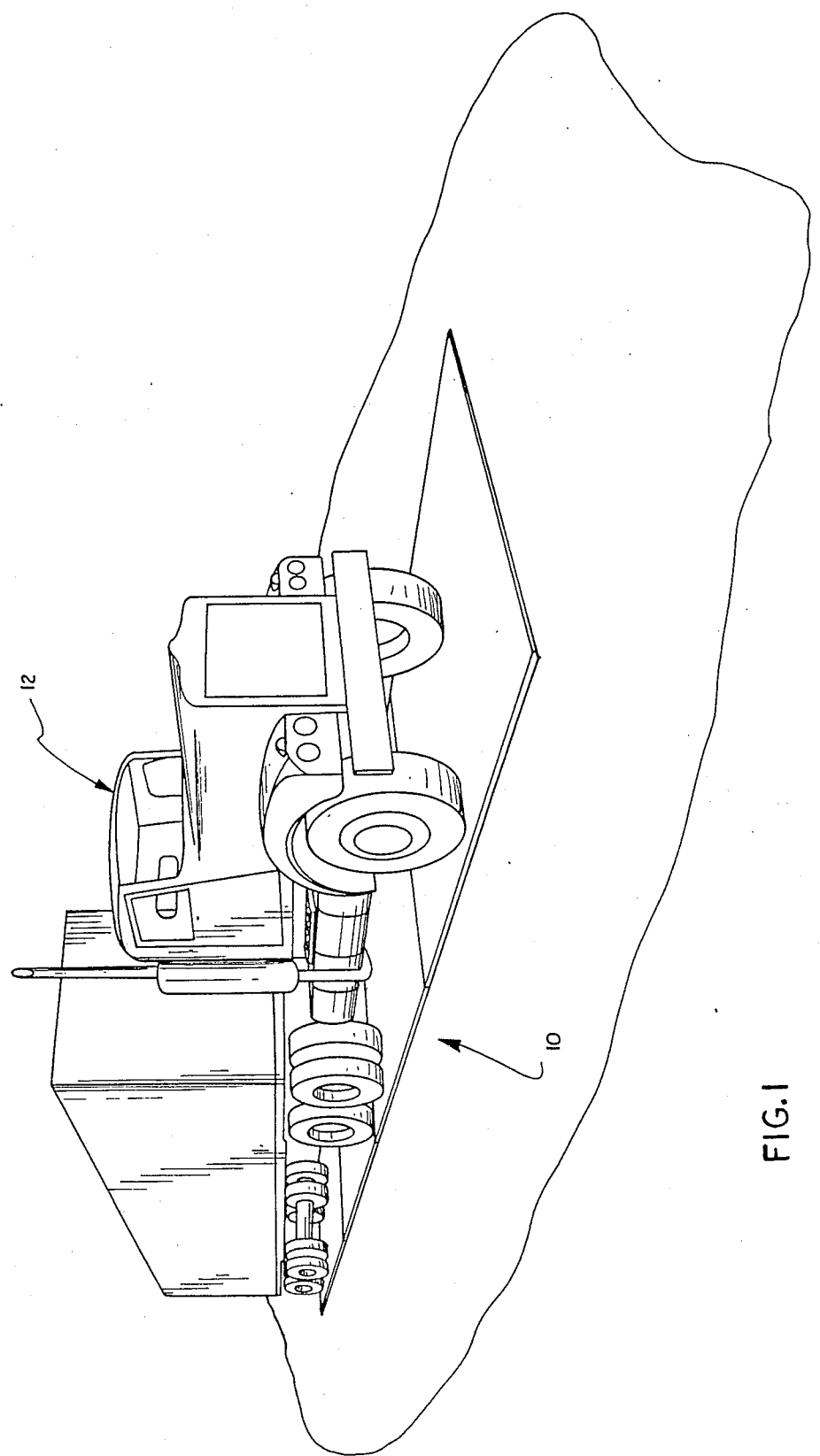
FIG. 1 is a schematic pictorial illustration depicting the manner in which a vehicle is weighed on a scale assembly constructed in accordance with the present invention.

A scale assembly 10 (FIG. 1) constructed in accordance with the present invention is utilized to weigh relatively large loads, such as a truck 12. The scale assembly 10 is preferably disposed on a shallow or deep pit foundation, as is known.

The scale assembly 10 includes a rectangular platform 16 (FIG. 3). The platform 16 has a central longitudinal axis 16a and is supported at locations 16b spaced along the longitudinal axis 16a by load sensing means. The load sensing means may be of different constructions. In the illustrated embodiment, the load sensing means comprises a plurality of transducers or load cells 18. Although only two load cells 18 are shown in FIG. 2, it should be understood that the platform 16 is supported by four load cells, one load cell at each side of the platform 16 at each location 16b. The load cells at each end of the platform are located in a common plane perpendicular to the longitudinal axis 16a of the platform. Although the load cells 18 could have many different constructions, they are advantageously Cap-Check (Trademark) load cells sold by Toledo Scale Division of Reliance Electric Company having a place of business at Worthington, Ohio, U.S.A.

The rectangular platform 16 includes an upper portion 22 (FIG. 2) and a lower portion 24. The upper portion 22 has a horizontal upper surface 26 which receives a load to be weighed. The lower portion 24 includes a pair of parallel main beams 30, 32 (FIG. 3) which extend between the transducers 18 and support the upper portion 22. The beams 30, 32 are spaced equal distances from the longitudinal axis 16a of the platform and extend generally parallel thereto. The lower portion 24 is fixedly secured to the upper portion 22 so that there is no relative movement between the upper and lower portions.

Therefore, the upper and lower portions 22, 24 function as a composite beam. When a load is applied to the platform 16 between the support locations 16b where the load cells 18 are located, the upper portion 22 is deflected to a concave configuration and the forces therein act only in compression. At least the bottom part of the lower portion 24 is stressed so that the forces therein act only in tension. The portion of the platform 16 stressed in compression is separated from the portion of the platform stressed in tension by a neutral plane at which there is zero stress.

The neutral axis of the platform 16 at any cross section taken perpendicular to the horizontal longitudinal axes of the main beams 30 and 32, lies on the neutral plane. The neutral plane for the platform 16 lies in the lower portion 24 of the platform and is immediately beneath the upper portion 22 of the platform. The neutral plane has been indicated schematically by the line 34 in FIG. 4. It should be understood that the line 34 also represents the neutral axis of the cross section of the Platform illustrated in FIG. 4.

In the embodiment of the invention illustrated in FIG. 4, the neutral plane 34 of the platform 16 is disposed a short distance below connections 36 and 38 between the upper and lower portions 22 and 24 of the platform 16. Since the connections 36 and 38 are immediately adjacent to the neutral plane 34, there is very little horizontal shear stress in the connections. Although the neutral plane 34 has been shown in FIG. 4 as being below the connections 36 and 38, the neutral plane 34 could extend through the connections so that the horizontal shear stress at the connections would be minimized.

The upper portion 22 of the platform 16 includes a metal pan or container 42 (FIG. 4) which holds a body 44 of concrete. The lower portion 24 is formed entirely of metal and includes the steel main beams 30 and 32. The upper and lower portions 22 and 24 of the platform 16 are fixedly interconnected at the connections 36 and 38 so that no relative movement can occur between the upper and lower portions of the platform 16. Therefore, the platform 16 is a composite beam in which the body of concrete 44 is stressed only in compression and the metal main beams 30 and 32 are stressed almost entirely in tension when a load is located on the platform between the load cells 18.

In accordance with a feature of the present invention, the lower portion 24 of the platform 16, namely beams 30 and 32, has a light weight construction. However, the construction of the lower portion 24 of the platform is such that the reduction in weight of the platform is obtained while maintaining the strength of the platform to withstand loads applied to the upper portion 22 of the platform.

The main beam 32 has a longitudinally tapered configuration (FIG. 2) and has only a lower flange 48. (FIG. 4). A vertical web 50 of the main beam 32 is connected directly to the metal pan 42 in the upper portion 22 of the platform 16 by the connection 38. In the present instance, the connection 38 is a weld which extends continuously for the entire length of the web 50 to fixedly interconnect the pan 42 and web 50 so there can be no shifting or relative movement between the pan 42 and the main beam 32. The weld 38 could be intermittent.

The main beam 30 extends parallel to the main beam 32 and has the same construction as the main beam 32. Thus, the main beam 30 is longitudinally tapered and has only a lower flange 52. A vertical web 54 of the main beam 30 is fixedly connected to the pan 42 by the weld 36 which extends continuously throughout the length of the main beam 30. The weld 36, like weld 38, could be intermittent.

In one specific embodiment of the invention, the platform 16 has an overall length of 60 feet. Thus, the main beams 30 and 32 of the lower portion 24 of the platform 16, in this embodiment example, have a length of 60 feet. The lower portion 24 of the platform has a weight of less than 120 pounds per foot. The combined upper 22 and lower 24 portions of the platform 16 have a rectangular moment of inertia which varies from 3316 to 10,660 inches$^4$. In this specific embodiment of the invention, the 60 foot long lower portion 24 had a weight of 6,642 pounds. The composite comprising the upper 22 and lower 24 portions of the platform have an average rectangular moment of inertia of 6,894 inches$^4$.

If the platform was not a composite, as in the prior art, and standard wide flange beams were used, beams W 36×135 60 feet long and having a rectangular moment of inertia of 7,800 inches$^4$ would be one of the lightest standard wide flanged beams usable. If two of these beams are used to support the concrete, without a connection therebetween the weight of the beams would be approximately 16,200 pounds.

If standard wide flange beams were used with shear connections, such as Nelson studs, between the upper and lower portions 22 and 24 of the platform 16 were used, the weight of the two main beams 30 and 32 for W 27×94 beams 60 feet long would be 11,280 pounds. The rectangular moment of inertia of the platform would be 7,872 inches$^4$. The foregoing weight and strength calculations assume that the upper portion 22 of the platform has the construction illustrated in FIG. 4.

Figure 4:
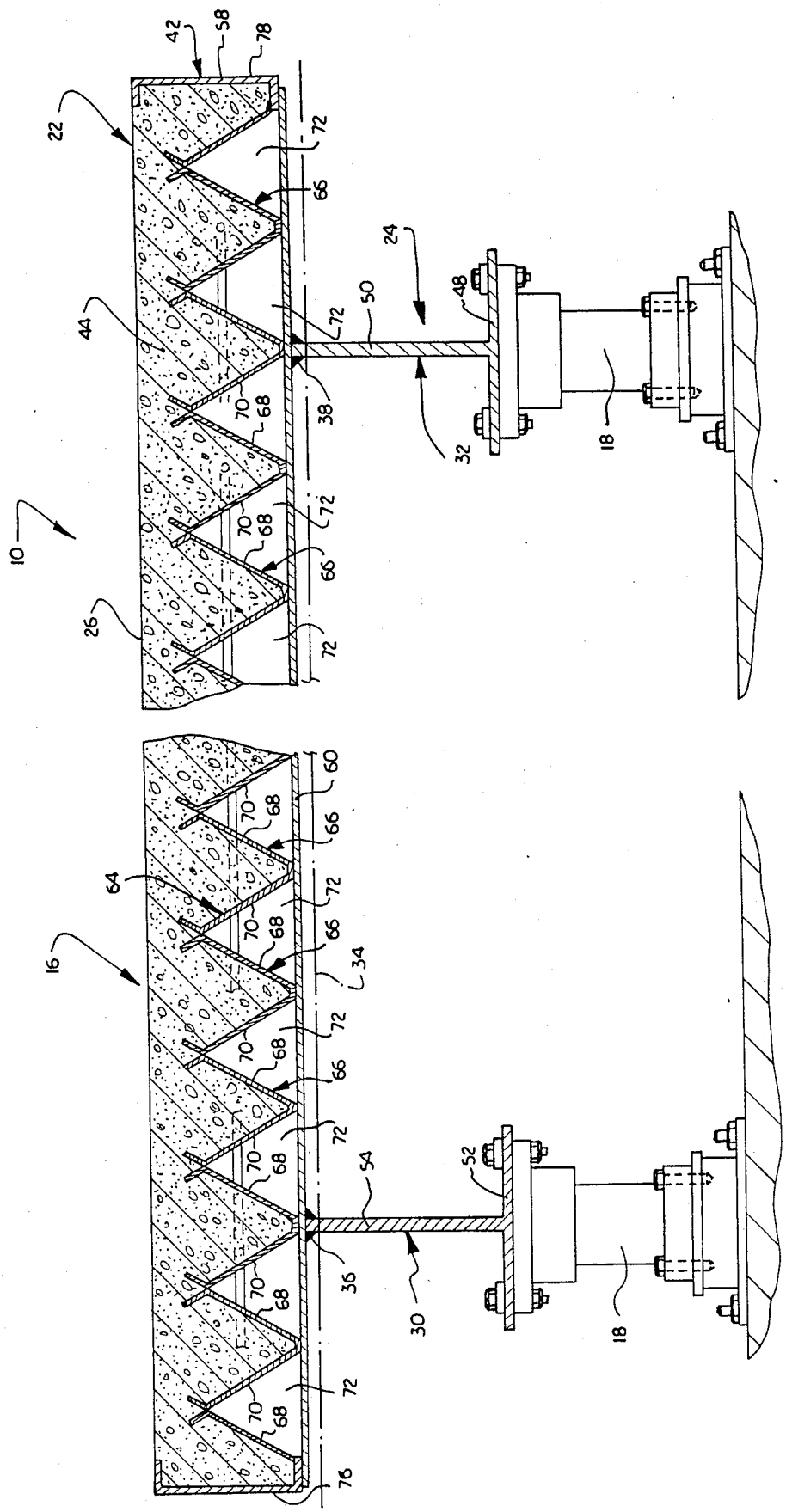
FIG. 4 is a sectional view, taken generally along the line 4—4 of FIG. 2, further illustrating the construction of the platform and its relationship to the transducers.

In view of the foregoing it is apparent that the total weight of the lower portion 24 if formed with standard wide flange beams and a shear connection between the upper and lower portions 22 and 24 of the platform 16 is approximately 1.7 times as great as when the main beams 30 and 32 are constructed in the manner illustrated in FIG. 4. If the shear connection is omitted, the weight of the main beams 30 and 32 using standard wide flange beams would be increased to 2.4 times the weight of main beams 30 and 32 when constructed in the manner illustrated in FIG. 4. Thus, by fixedly connecting the pan or container 42 in the upper portion 22 of the platform 16 to the webs 50 of "T" shape and tapered main beams 30 and 32, substantial reductions in the weight of the lower portion 24 of the platform 16 are obtained. This is because the body 44 of concrete in the upper portion 22 of the platform 16 and the steel in the main beams 30 and 32 acts in a composite manner with the body of concrete resisting primarily compressive stresses and the steel resisting primarily the tension stresses.

Attaching the pan or container 42 to a standard wide flange beam in a conventional manner, such as by bolts, enables slippage to occur in a horizontal plane between the container and the wide flange beams. In a platform having this construction, the concrete in the upper portion of the platform and the steel in the lower portion of the platform each bend about their individual neutral planes. Due to its relatively low strength in tension, the concrete in the upper portion of the platform would contribute very little to the strength of the platform in a longitudinal direction. The concrete in the upper portion of the platform would only increase the stress in the standard wide flange steel beams because the beams would have to support the dead load of the concrete in addition to the load being weighed.

Upper Portion

The upper portion 22 of the platform 16 includes a metal pan or container 42 and the body 44 (FIG. 4) of concrete. The metal container 42 includes a rectangular metal frame 58. A flat rectangular steel bottom plate 60 is connected with the frame 58. The horizontal bottom plate 60 extends parallel to the upper side surface 26 of the body 44 of concrete. The bottom plate 60 extends throughout the length and width of the rectangular platform 16. The bottom plate 60 is disposed only slightly above and extends parallel to the neutral plane 34.

A steel rib structure 64 (FIG. 4) is fixedly connected to the bottom plate 60. The steel rib structure 64 is formed of interconnected V-shaped ribs 66. Each of the ribs 66 has a pair of flat main panels 68 and 70 which form upwardly diverging legs of the ribs. Upwardly facing inner major side surfaces of the main panels 68 and 70 abut the corrugated lower major side of the rectangular body 44 of concrete. Downwardly facing outer major sides of the panels 68 and 70 cooperate with the upper surface of the flat bottom plate 60 to define longitudinally extending cavities 72. The cavities 72 have a generally triangular cross sectional configuration and extend throughout the length of the platform 16. The longitudinal central axes of the cavities 72 extend parallel to the neutral plane 34.

The rectangular frame 58 circumscribes the body 44 of concrete. Thus, the frame 58 includes a pair of steel side beams 76 and 78 which extend throughout the length of the platform 16. The side beams 76 and 78 have a length which corresponds to the length of the main beams 30 and 32 in the lower portion 24 of the platform 16. The bottom plate 60 is secured to lower end portions of the side beams 76 and 78. A pair of end beams (not shown) have a generally L-shaped configuration and extend perpendicular to the side beams 76 and 78 at opposite ends of the platform 16. The end beams block the ends of the longitudinally extending cavities 72.

When the platform 16 is to be constructed, the rigid frame 58 is fabricated and connected with the bottom panel 60. The steel V-shaped ribs 66 are welded to the upper major side of the bottom plate 60. The ribs 66 are welded to the bottom plate at the lower apex of the ribs. The upper ends of the main panels 68 and 70 of adjacent ribs 66 are then welded together to form a unitary structure. The pan 42 is then connected to the main beams 30 and 32.

The V-shaped ribs 66 (FIG. 4) are formed of sheet metal, for example, 16 gauge sheet steel. The bottom plate 60 may also be formed of sheet steel, for example, 11 gauge sheet steel. Of course, ribs 66 and the bottom plate 60 of different thickness could be used if desired.

Concrete is poured into the pan 42 at an installation site. The frame 58 is filled with the concrete to the top of the side beams 76 and 78. Even though the pan 42 is filled with concrete, the upper portion 22 of the platform 16 is relatively light weight, due to the presence of the cavities 72. When a load is applied to the upper portion 22 of the platform 16, the body of concrete 44 is stressed in compression and the metal container 42 prevents shifting movement of the concrete as it is compressed. The upper portion 22 of the platform 16 has the same general construction disclosed in U.S. Pat. No. 4,529,051 issued July 16, 1985 and entitled Scale Assembly With Improved Platform.

Lower Portion

The lower portion 24 of the platform 16 has a relatively light weight. The lower portion 24 of the platform 16 has an average weight of less than 120 pounds per foot of length. This relatively light weight is promoted by forming the main beams 30 and 32 with a tapered configuration (FIG. 2) and by fixedly connecting the web portions 50 and 54 of the main beams with the bottom plate 60 of the pan 42.

The main beam 32 includes a pair of identical uniform width end sections 82 and 84 (FIG. 2) and a pair of tapered central sections 86 and 88. The end sections 82 and 84 and central sections 86 and 88 are interconnected by suitable fastening means to form a unitary beam structure. Each of the sections 82, 84, 86 and 88 of the main beam 32 has a bottom flange 48 and an upstanding web 50 (FIG. 4).

In the specific example of a 60 foot platform previously mentioned, the sections 82, 84, 86 and 88 of the main beam 32 are all of the same length, that is 15 feet. The end sections 82 and 84 have a flange 48 with a width of 14 inches and a thickness of 0.75 inches and a length of 15 feet. The end sections 82 and 84 have a web with a height of 18 inches, a thickness of 0.3125 inches and a length of 15 feet. The total weight of one of the end sections 82 or 84 is 822.25 pounds. The combined weight of the two end sections 82 and 84 is 1,644.5 pounds.

The central sections 86 and 88 of the main beam 32 have a flange 48 with a width of 14 inches, a thickness of 0.75 inches and a length of 15 feet. The central sections 86 and 88 have a web with a height which tapers uniformly from a minimum of 18 inches to a maximum of 29.5 inches at the center of the platform 16, a uniform thickness of 0.25 inches and a length of 15 feet. The weight of one of the central sections 86 or 88 of the main beam 32 is 838.25 pounds. The combined weight of the two center sections 86 and 88 of the main beam 32 is 1,676.5 pounds.

Although the foregoing specific dimensions and weights were for the main beam 32, it should be understood that the main beam 30 had the same weight and dimensions. Thus, the total weight of the two main beams 30 and 32 is 6,642 pounds. The foregoing specific dimensions and weights for the main beams 30 and 32 have been set forth for purposes for clarity of illustration and not for purposes of limitation. It should be understood that specific main beams 30 and 32 used in a particular scale platform 16 may have different dimensions and weights.

Figure 5:
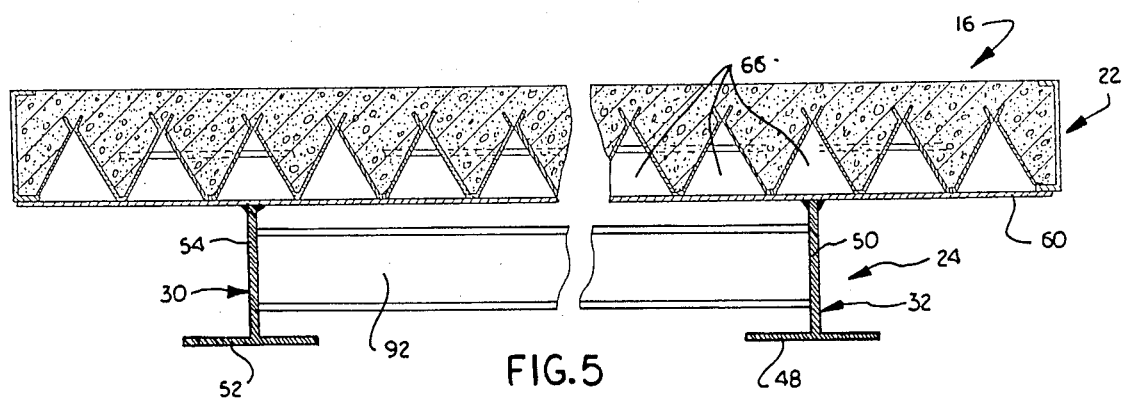
FIG. 5 is a sectional view, taken generally along the line 5—5 of FIG. 3, illustrating bracing between a pair of main beams in the lower portion of the platform.

The main beams 30 and 32 are stabilized at opposite ends by cross members 92 and 94 (FIG. 3). The cross member 92 is disposed adjacent to the left end (as viewed in FIG. 3) of the platform 16 and is connected with the webs 50 and 54 of the main beams 32 and 30 (FIG. 5). In one specific embodiment cross members 92 and 94 are C channels, specifically C 6×10.5 channels, which were 6 feet 10.125 inches long. Each of the cross members 92 and 94 added 113.86 pounds to the weight of the lower portion 24 of the platform 16.

Figure 6:
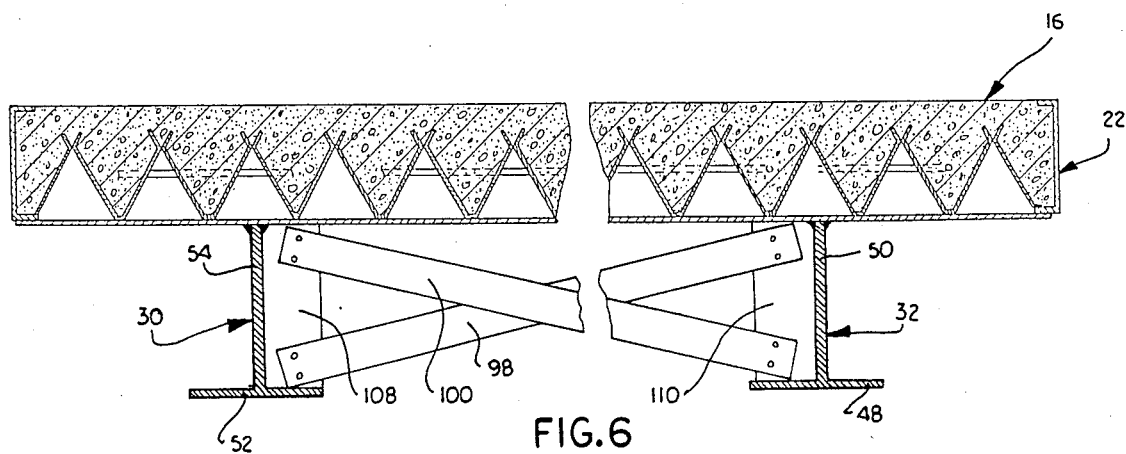
FIG. 6 is an elevational view, taken generally along the line 6—6 of FIG. 3, further illustrating bracing between the main beams.

In addition to the cross members 92 and 94, pairs of cross braces 98, 100 and 102, 104 are provided at spaced apart locations between the main beams 30 and 32. The cross braces 98 and 100 (FIG. 6) are connected with the webs 50 and 54 of the main beams 30 and 32 by mounting plates 108 and 110. The cross members 98 and 100 were cross angles, specifically L-shaped angles having a thickness of ⅜ inch and 3 inch legs. Each of the cross angles weighed 62.7 pounds.

The tapered beams 30, 32 and the low weight composite platform structure enable the distance or span between the platform support locations 16b at the opposite ends of platform 16 to be 44 feet. Thus, for a 60 foot platform the distance from each end of the platform to the adjacent location 16b of platform support is eight feet. The large span of forty-four feet with only four load sensing means, i.e. transducers 18, in the illustrated example, and the light weight composite platform result in a low cost truck scale.

Second Embodiment of the Invention

In the embodiment of the invention illustrated in FIGS. 1 through 6, the main beams 30 and 32 have only lower flanges 48 and 52. It is contemplated, that under certain circumstances, it may be desirable to provide the main beams 30 and 32 with upper flanges. However, since the upper flanges would be on or closely adjacent to the neutral plane 34 of the scale platform 16, the upper flanges carry little or no stress when the scale platform is loaded. Since the embodiment of the invention illustrated in FIG. 7 is generally similar to the embodiment of the invention illustrated in FIGS. 1–6, similar numerals will be utilized to designate similar components, the suffix letter "a" being associated with the numerals of FIG. 7 in order to avoid confusion.

The scale platform 16a has an upper section 22a and a lower section 24a. The lower section 24a includes a pair of parallel main beams 30a and 32a. The main beams 30a and 32a are supported by transducers 18a.

The upper section 22a of the scale platform 16a includes a rectangular pan or container 42a which encloses a body 44a of concrete. The main beams 30a and 32a are fixedly connected to a bottom panel 60a of the container 42a so that there can be no relative movement between the main beams and the container when the scale platform 16a is loaded.

Figure 7:
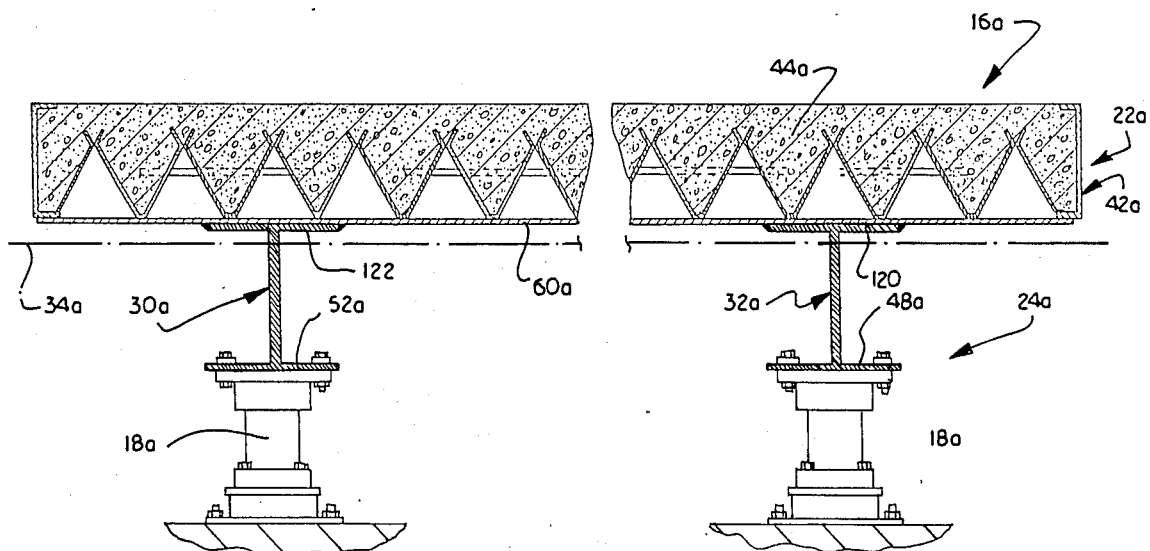
FIG. 7 is a sectional view, generally similar to FIG. 4, of a second embodiment of the invention.

In accordance with a feature of the embodiment of the invention illustrated in FIG. 7, the main beam 32a has a lower flange 48a and an upper flange 120 which is fixedly connected to the bottom 60a of the container 42a. Similarly, the main beam 30a has a lower flange 52a and an upper flange 122 which is fixedly connected to the bottom panel 60a of the container 42a. Although the upper flanges 120 and 122 on the main beams 30a and 32a distribute a portion of the vertical load between the upper section 22a and lower section 24a of the platform 16a, the flanges 120 and 122 carry very little compressive stress since they are adjacent to the neutral axis 34a of the platform 16a.

From the above description of preferred embodiments of the invention, those skilled in the art will perceive improvements, changes and modifications. Such improvements, changes and modifications are intended to be covered by the appended claims.

Having described specific preferred embodiments of the invention, the following is claimed:

1. A scale assembly for use in weighing a load, said scale assembly comprising load sensing means for providing an output indicative of the magnitude of a load and platform means for receiving a load to be weighed and supported at locations longitudinally spaced along said platform means by said load sensing means, said platform means comprising an upper portion which includes a body of concrete, a lower portion disclosed below the upper portion and formed of metal, said lower portion including a plurality of spaced apart longitudinally extending metal beams, and connector means for preventing relative movement between said body of concrete and said lower portion of said platform means upon the application of a load to said platform means, said body of concrete being stressed only in compression and said longitudinally extending beams being stressed in tension when said platform means receives a load to be weighed between said location, said platforms means having only one neutral plane which separates the portion of said platform means stressed in compression from the portion of said platform means stressed in tension, said neutral plane being disposed in the lower portion of said platform means below said body of concrete, said upper portion of said platform means including a metal container which holds said body of concrete, each of said beams including a bottom flange and a web section which extends upwardly from said bottom flange to said metal container, said web section being fixedly connected to said metal container by said connector means.

2. A scale assembly as set forth in claim 1 wherein said connector means includes a plurality of welds, each of said welds extending between said container and the web section of one of said beams.

3. A scale assembly as set forth in claim 2 wherein each of said welds extends for the length of one of said beams.

4. A scale assembly as set forth in claim 1 wherein said lower portion of said platform means has an average weight of less than 120 pounds per foot of length and said upper and lower portions of said platform means have a rectangular moment of inertia which varies between 3,316 to 10,660 inches$^4$ along its length.

5. A scale assembly for use in weighing a load, said scale assembly comprising load sensing means for providing an output indicative of the magnitude of a load and platform means for receiving a load to be weighed and supporting at locations longitudinally spaced along said platform means by said load sensing means, said platform means comprising an upper portion which includes a body of concrete, a lower portion disposed below the upper portion and formed of metal, said lower portion including a plurality of spaced apart longitudinally extending metal beams, and connector means for preventing relative movement between said body of concrete and said lower portion of said platform means upon the application of a load to aid platform means, said body of concrete being stressed only in compression and said longitudinally extending beams being stressed in tension when said platform means receives a load to be weighed between said locations, said platform means having only one neutral plane which separates the portion of said platform means stressed in compression from the portion of said platform means stressed in tension, said neutral plane being disposed in the lower portion of said platform means below said body of concrete, said upper portion of said platform means including a rectangular metal bottom panel having generally horizontal major side surfaces, a plurality of side panels connected to and extending upwardly from said bottom panel at locations adjacent to edges of said bottom panel, a plurality of metal rib panels connected to an upper major side surface of said bottom panel, said rib panels having major side surfaces which are skewed at acute angles to the upper major side surface of said bottom panel, said rib panels cooperating with said bottom panel to define a plurality of elongated empty cavities which extend throughout the length of said platform means, said body of concrete being disposed in engagement with upper major side surfaces of said rib panels, said plurality of longitudinally extending beams having central axes extending parallel to the longitudinal axes of said cavities, said connector means including means for fixedly connecting said beams to said bottom panel.

6. A scale assembly as set forth in claim 5 wherein each of said beams is longitudinally tapered in opposite directions from a central portion and having a first bottom flange section which slopes upwardly toward the bottom panel and extends in a first direction from the central portion of the beam and a second bottom flange section which slopes upwardly toward the bottom panel and extends in a second direction from the central portion of the beam, each of said beams including a first vertical web section which is disposed between said bottom panel and said first bottom flange section and which tapers and decreased in height as it extends in the first direction from the central portion of the beam and a second vertical web section which is disposed between said bottom panel and said second bottom flange section and which tapers and decreases in height as it extends in the second direction from the central portion of the beam, and connector means for connecting said beams in said bottom panel.

7. A scale assembly as set forth in claim 6 wherein said lower portion of said platform means includes cross brace means interconnecting said beams and extending transversely to the longitudinal axes of said cavities and of said beams.

8. A scale assembly as set forth in claim 5 wherein each of said beams has a web extending perpendicular to and disposed in abutting engagement with said bottom panel, said connector means including a plurality of welds extending between the webs of said beams and said bottom panel to fixedly secure the webs of said beams to said bottom panel.

9. A scale assembly as set forth in claim 5 wherein said connector means includes a plurality of longitudinally extending welds interconnecting said beams and said bottom panel, said welds having longitudinal axes extending parallel to the longitudinal axes of said cavities.

10. A scale assembly for use in weighing a load, said scale assembly comprising load sensing means for providing an output indicative of the magnitude of a load and platform means for receiving a load to be weighed and supported at locations longitudinally spaced along said platform means by said load sensing means, said platform means comprising an upper portion which includes a body of concrete, a lower portion disposed below the upper portion and formed of metal, said lower portion including a plurality of spaced apart longitudinally extending metal beams, and connector means for preventing relative movement between said body of concrete and said lower portion of said platform means upon the application of a load to said platform means, said body of concrete being stressed only in compression and said longitudinally extending beams being stressed in tension when said platform means receives a load to be weighed between said locations, said platform means having only one neutral plane which separates the portion of said platform means stressed in compression from the portion of said platform means stressed in tension, said neutral plane being disposed in the lower portion of said platform means below said body of concrete, said beams extending longitudinally of said platform and having portions which taper and decrease in height as they extend from a center position between said locations toward said locations.

11. A scale assembly as defined in claim 10 wherein said platform means is supported by said load sensing means at four locations, two locations being adjacent each of the opposite ends of said platform means.

12. A scale assembly for use in weighing a load, said scale assembly comprising load sensing means for providing an output indicative of the magnitude of a load and platform means for receiving a load to be weighed and supported at locations longitudinally spaced along said platform means by said load sensing means, said platform means comprising an upper portion which includes a body of concrete, a lower portion disposed below the upper portion and formed of metal, said lower portion including a plurality of spaced apart longitudinally extending metal beams, and connector means for preventing relative movement between said body of concrete and said lower portion of said platform means upon the application of a load to said platform means, said body of concrete being stressed only in compression and said longitudinally extending beams being stressed in tension when said platform means receives a load to be weighed between said locations, said platform means having only one neutral plane which separates the portion of said platform means stressed in compression from the portion of said platform means stressed in tension, said neutral plane being disposed in the lower portion of said platform means below said body of concrete, said upper portion of said platform means including a flat bottom panel having generally horizontal major side surfaces, said connector means including a plurality of connector elements having lower end portions fixedly connected to said upper major side surface of said bottom panel and upper end portions fixedly connected to said body of concrete at locations spaced from said bottom panel, said connector means further including a plurality of welds connecting said beams to said lower major side surface of said bottom panel.

13. A scale assembly for use in weighing a load, said scale assembly comprising load sensing means for providing an output indicative of the magnitude of a load and platform means for receiving a load to be weighed and supported at locations longitudinally spaced along said platform means by said sensing means, said platform means comprising an upper portion and a lower portion disposed below said upper portion, said upper portion including a flat rectangular metal bottom panel having generally horizontal major side surfaces which are coextensive with said platform means, a plurality of metal side panels forming a rectangular frame connected with said bottom panel, a body of concrete supported by said bottom panel and enclosed by said side panels, said lower portion including a plurality of spaced apart longitudinally extending metal beams disposed beneath said bottom panel and supported by said load sensing means, each of said beams being longitudinally tapered in opposite directions from a central portion and having a first bottom flange section which slopes upwardly toward the bottom panel and extends in a first direction from the central portion of the beam and a second bottom flange section which slopes upwardly toward the bottom panel and extends in a second direction from the central portion of the beam, each of said beams including a first vertical web section which is disposed between said bottom panel and said first bottom flange section and which tapers and decreases in height as it extends in the first direction from the central portion of the beam and a second vertical web section which is disposed between said bottom panel and said second bottom flange section and which tapers and decreases in height as it extends in the second direction from the central portion of the beam, and connector means for connecting said beams to said bottom panel.

14. A scale assembly as set forth in claim 13 wherein said connector means includes a plurality of continuous welds each of which extends for the length of one of said beams and connects said one beam with said bottom panel.

15. A scale assembly as set forth in claim 13 wherein each of said beams has a top flange section having a length which is at least as great as the combined length of said first and second bottom flange sections, said web section extending between said top and bottom flange sections, each of said top flange sections having an upper side which is disposed in flat abutting engagement with said bottom panel.

16. A scale assembly as set forth in claim 13 wherein each of said web sections is disposed in abutting engagement with the bottom panel, said connector means including a plurality of welds extending between said web sections and said bottom panel.

17. A scale assembly as set forth in claim 16 wherein each of said welds extends for the length of one of said beams.

18. A scale assembly as set forth in claim 13 wherein said body of concrete is stressed only in compression and said longitudinally extending beams are stressed in tension when said platform means receives a load to be weighed between said locations, said platform means having only one neutral plane which separates the portion of said platform means stressed in compression from the portion of said platform means stressed in tension, said neutral plane being disposed in the lower portion of said platform means.

19. A scale assembly as set forth in claim 13 wherein said lower portion of said platform means has an average weight of less than 120 pounds per foot of length and said upper and lower portions of said platform means have a rectangular moment of inertia which varies between 3,316 to 10,660 inches$^4$ along its length.

* * * * *